United States Patent Office 3,471,411
Patented Oct. 7, 1969

3,471,411
ANTIMONY ALCOHOLATE CATALYST
COMPOSITION
Russell A. Bowman and Bruce N. Wilson, Niagara Falls, N.Y., assignors to Hooker Chemical Corporation, Niagara Falls, N.Y., a corporation of New York
No Drawing. Continuation-in-part of application Ser. No. 561,687, June 30, 1966. This application Sept. 18, 1967, Ser. No. 668,645
Int. Cl. B01j 11/82; C08g 41/00; C07f 9/90
U.S. Cl. 252—431        6 Claims

ABSTRACT OF THE DISCLOSURE

A catalytic composition consisting essentially of a reaction product and a carrier therefor is prepared by reacting an alcohol having at least three hydroxyl groups with a trivalent antimony or bismuth compound in a ratio which provides at least 1.5 moles of the alcohol for each unit atomic weight of the metallic element.

The catalyst composition is useful in the preparation of polymers such as polyurethanes and polyethers.

Cross-references to other applications

This is a continuation-in-part of application Ser. No. 561,687, filed June 30, 1966, now abandoned, which was a continuation-in-part of application Ser. No. 155,832, filed Nov. 29, 1961, now abandoned.

This invention relates to improved catalytic compositions comprising organic compounds of antimony and a carrier.

Substantially pure, novel organic compounds of antimony have been prepared recently having the following structural formulae:

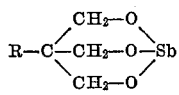

or

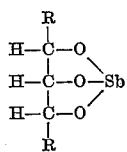

wherein R is selected from the group consisting of hydrogen, alkyl, substituted alkyl, aryl, substituted aryl, and mixtures thereof. Such compounds are disclosed in United States Patent No. 3,109,853.

The above compounds are highly crystalline and of such limited solubility in ordinary solvents that their purification has been limited to sublimation as a final purification step, and the entire purification process has been so involved that the expense of pure compounds is prohibitively high. Nevertheless, the purification steps have been considered to be essential heretofore in order to produce a pure specific compound that would be useful for many purposes normally requiring a pure known substance. For instance, one large use for the above antimony compounds that heretofore was thought to yield better results in the form of a specific pure substance is as a catalyst for various organic reactions, such as in the preparation of urethane foams and in oxyalkylation reactions.

It has been discovered that a composition consisting essentially of an unpurified reaction product and a carrier therefor prepared by reacting together an excess of certain alcohols with certain antimony compounds to be described in detail hereinafter is entirely satisfactory for use as a catalyst in organic reactions where the above-described pure known compounds of antimony were used heretofore. As is well known, even small amounts of impurities will often radically affect a catalyst and in turn the progress of the catalyzed reaction, and thus the above discovery is surprising and unexpected in view of the teachings of the art.

It is an object of the invention to provide a novel process for the preparation of an improved catalytic composition containing an organic compound of antimony and a carrier, and to provide the resultant improved catalytic composition.

Still other objects and advantages of the present invention will be apparent to those skilled in the art upon reference to the following detailed description and the examples.

In accordance with the present invention, a catalytic composition consisting essentially of a reaction product and a carrier therefor is prepared by reacting together an aliphatic alcohol having at least three hydroxyl groups and 3 to about 10 carbon atoms and a trivalent antimony compound. The reaction mixture consists essentially of the alcohol and the compound containing a metallic element in a ratio providing substantially more than one mole of the alcohol for each unit atomic weight of the metallic element and preferably the alcohol is present in an amount to provide a reaction medium during the reaction and to act as a carrier for the resultant reaction product. The reaction mixture after completing the reaction contains excess unreacted alcohol as the carrier for the reaction product and the reaction product is present therein. The product of the invention is a catalytic composition consisting essentially of an antimony alcoholate having structural units of the formula R—O—Sb< and a carrier therefor, wherein R is a radical of an aliphatic alcohol having at least three hydroxyl groups and three to about ten carbon atoms, said composition containing at least 1.5 moles of alcoholic component for each unit atomic weight of antimony, and containing excess unreacted alcohol as said carrier. The foregoing R radical is derivable by removal of a hydrogen atom from at least one hydroxyl group of the aliphatic alcohol.

It is not necessary that the reaction mixture be purified and the resultant antimony compound be isolated in the pure state before use as a catalyst. It has been discovered that the unpurified reaction mixture is entirely satisfactory for use as a catalytic composition in catalyzing organic reactions of the same type for which the pure antimony compounds described herein have been used heretofore, and in fact the reaction mixture is often preferable to the pure compound. For instance, suprisingly the crude reaction mixture containing the resultant organic antimony compound present in an excess of the alcohol reactant will dissolved much more readily in the reaction mixture to be catalyzed and often without formation of a two phase system as is true with the pure antimony compounds. Thus, using the composition of the present invention as a catalyst assures more predictable, reproducible and trouble free results in the catalyzed process as well as allowing the catalyst to be produced at a much lower cost.

Illustrative alcohols which can be used in the present invention include pentaerythritol, dipentaerythritol, trimethylolpropane, trimethylolethane, trimethylolbutane, trimethylolisobutane, trimethylolpentane, trimethylolhexane, trimethylolnonane, trimethylolpropene, trimethylolbutene, trimethylolpentene, glycerol, sorbitol, hexanetriol, butanetriol, and the like. The foregoing alcohols may be substituted with non-interfering substituents such as chlorine, bromine, fluorine, iodine, alkyl, and aryl substituents such as phenyl, naphthyl, and the like. Generally preferred are the unsubstituted (containing only carbon, hydrogen and oxygen) aliphatic alcohols having at least three hydroxy groups and three to about ten carbon atoms. The alcohols generally have three to six hydroxyl groups, and three to six carbon atoms.

The preferred trivalent antimony compounds employed are those antimony compounds wherein three identical radicals are attached or bonded to the antimony atom. Typical of such antimony compounds are antimony trioxide, antimony trichloride, antimony oxychloride, tris hydrocarbyl antimonites and tris halohydrocarbyl antimonites, wherein the hydrocarbyl radicals have two to eight carbon atoms. Examples of the antimonites include tris (2-ethylhexyl) antimonite, tris (n-octyl) antimonite, tribenzyl antimonite, triphenyl antimonite and other esters of organic monohydroxy compounds with antimony trioxide. Other antimonites include tris (2-chloroethyl) antimonite, tris (2-chlorobutyl) antimonite, tris (2-chloro-2-phenylethyl) antimonite, and other esters of an epoxide a antimony trichloride to produce a beta-chloride antimonous acid.

The time and temperature of reaction are not critical and will vary depending upon the reactants employed, degree of completion of reaction desired, etc. Usually, the reaction can be continued from about 10 minutes to 10 to 30 hours or longer at a temperature of about 50 to 300 degrees centigrade, and preferably from about 45 minutes to about 4 hours, at a temperature of about 130 to 210 degrees centigrade. At higher reaction temperatures shorter reaction times may be employed, and vice versa. The reaction product thereby otbained may not be purified and the entire reaction mixture may be used as a catalyst composition.

The alcohol reactant is employed in substantial excess of that amount theoretically required to react with the antimony compound. The amount of this excess may vary over wide ranges, but generally it is desired that the reactant be present in a ratio of at least 1.5 and preferably two to four or more moles of the alcohol for each unit atomic weight of antimony employed as a reactant. The alcohol should be present in the reaction mixture in an amount to provide a reaction medium during the reaction and to act as a carrier for the reaction product after compelting the reaction. A perferred method of operation is to prepared the antimony or bismuth ester directly in the alcohol component to be used in the preparation of a resin. In this way a separate catalyst preparation step is eliminated. The catalyst component can be prepared in the course of heating the alcohol component. Hence, it is evident that extremely large molar ratios of alcohol to metallic compound are contemplated, even 100 to 1 and greater.

A solvent is not necessary and it is preferred that the excess alcohol reactant be used as the solvent. However, if it is desired a solvent may be used provided it is inert and it does not detrimentally affect the reaction product or its use as a catalyst. A solvent may have a boiling point above 150° C. and it should be substantially unreactive with the reactants or reaction products under the condition of the reaction, and it should not form stable reaction products under the conditions of the reaction.

The process of the present invention is highly satisfactory for the preparation of reaction mixtures from an alcohol such as trimethylolpropane, trimethylolethane, glycerol, and pentaerythritol, and an antimony or bismuth compound mentioned herein. Reaction mixtures prepared from an antimony compound and trimethylolpropane are often preferred catalysts for use in organic reactions, including formulations for foam alkyds or urethane foams, oxyalkylation reactions, etc. The process of the invention is capable of preparing unpurified reaction mixtures from an antimony compound and trimethylolpropane in excellent yield and the resultant product is as satisfactory as pure trimethylolpropane antimonite in the catalysis of organic reactions.

The process described herein is especially useful in the preparation of reaction mixtures from antimony or bismuth compounds and normally solid polyalcohols such as trimethylolpropane. The trimethylolpropane is present in excess in the molten reaction mixture and, upon completion of the reaction at elevated temperature, the trimethylolpropane-antimony reaction product is dissolved in the excess molten trimethylolpropane which acts as a solvent or suspension medium. By cooling the reaction mixture to a point where it is viscous but still pourable, the reaction product separates out in the form of fine crystals which are held in uniform suspension. The viscous reaction mixture then may be solidified quickly so as to form a solid material with fine crystals of the reaction product distributed substantially uniformly therethrough. The solid product may be ground to particles of a desired size, and it is in a very convenient form for use as a catalyst.

During the reaction in instances where an oxide of the desired metal is used, the water of reaction may be removed by distillation, or preferably by distillation under reduced pressure. For instance, a reduced pressure of about 20–30 millimeters of mercury absolute at a reaction temperature of about 160–185° C. has been found to be very satisfactory when preparing a reaction mixture from trimethylolpropane and an antimony compound. However, other temperatures of reactions and other reduced pressures may be selected as necessary to assure the removal of the water of reaction efficiently and to provide a reaction mixture at the completion of the reaction which is substantially free of water. In such instances, it is desirable that the reaction be continued at the reaction temperature and under the reduced pressure until water is no longer removed.

When catalyzing organic reactions with the composition of the invention, there is usually no need to change prior art practice with the exception of substituting the catalyst composition of the invention for the pure antimony or bismuth compounds formerly used for this purpose. For example, urethane foams may be prepared following prior practice with the exception of reacting the polyethers and/or alkyd resins together with a polyisocyanate in the presence of a catalytic amount of the catalyst composition of the invention. Similarly, where an active hydrogen-containing material containing hydroxyl groups is reacted together with an alkylene oxide to produce the oxyalkyl derivative, the prior art practice need be changed only to the extent of substituting a catalytic amount of the catalyst composition of the inventions for the catalyst previously used.

The nature of the alcohol-metallic compound reaction product which is present in the reaction mixture is not fully understood at the present time. However, it is known that when the metallic compound is an oxide, water of reaction is given off and presumably the reaction is between the hydroxyl groups of the alcohol and the metallic element ot form

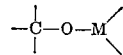

linkages, where M is the metallic element. Since an excess of alcohol is used it is not possible at this time to say whether or not the metallic element is attached to only one oxygen atom or more of any given alcohol molecule to satisfy its trivalent nature. It is possible that the metallic element is attached to up to three separate alcohol molecules through the above described linkages, and that this explains the marked increase in solubility and other favorable characteristics of the reaction product of the invention.

The foregoing detailed description and the following specific examples are for purposes of illustration only, and are not intended to limit the invention.

Example 1

This example illustrates the preparation of a reaction product in accordance with the present invention from antimony trioxide and glycerol which is suitable for use as a catalyst in organic reactions.

16 moles of glycerine and 1 mole of antimony trioxide are charged to a 3 liter, 3-necked flask. The temperature is raised to 160° C., at which temperature water is driven off and the reaction proceeds. When the water ceases to exude, a vacuum is applied to remove additional quantities of reaction water. When further water ceases to exude, the vacuum is broken with inert gas. The resultant product is decanted, cooled, and stored for use as a catalyst without further purification or removal of the excess glycerol.

Example 2

This example illustrates the preparation of a catalyst which is the reaction product of antimony trioxide and trimethylolpropane.

Reactants are charged to a typical resin reactor (glass or stainless steel) in the molar ratio of 4 moles of trimethylolpropane to 1 mole of antimony trioxide ($Sb_2O_3$). Heat is applied and the charge melts. As the charge melts, agitation is applied, and thereafter the temperature is raised to 160–185° C. Vacuum (20–30 millimeters of mercury absolute) is applied to remove the reaction water as the reaction proceeds.

When the water of reaction ceases to exude, the vacuum is broken with inert gas and the reaction product is cooled to a point where a thick slurry exists (90–120° C.). The reaction product without further purification is then discharged into a suitable container such as a steel container where it is allowed to cool to room temperature. Subsequently, the product is coarsely ground for use as a catalyst without further purification being necessary.

It is desirable to decant the reactor contents at the thick slurry stage so that phase separation of the reaction product, which is in the form of crystals suspended in the fused excess unreacted trimethylolpropane carrier, does not occur during periods of no agitation. When this is done, clear needle-like crystals of the reaction product of trimethylolpropane and antimony trioxide may be seen distributed uniformly throughout the solidified trimethylolpropane carrier. Thus, a substantially uniform homogenous product is produced which is highly useful as a catalyst.

Example 3

Using the same procedure as described in Example 2, a catalyst composition is prepared by reacting six moles of trimethylolethane and one mole of antimony trioxide.

Example 4

35.5 moles of pentaerylthritol and 17.7 moles of antimony trioxide are mixed and gradually heated to the temperature range of one hundred and sixty to one hundred and sixty-five degrees centigrade. Vacuum (about twenty-three millimeters of mercury absolute) is applied for one hour and ten minutes. The distillation of water begins at one hundred and sixty-two degrees centigrade. When the water of reaction has been removed, the reaction products is discharged into a suitable container where it is allowed to cool to room temperature.

Example 5

This example illustrates the application of the principles of this invention to a commercial polyhydric component, a polyoxy propylene derivative of trimethylolpropane having the following structural formula

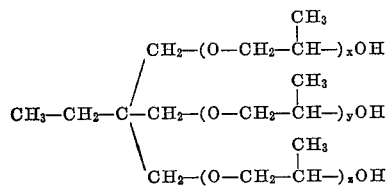

Twenty moles of pentaerythritol, 12.2 moles of the above-identified commercial polyoxy propylene derivative of trimethylolpropane are blended with ten moles of antimony trioxide and gradually heated to the temperature range of one hundred and sixty to one hundred and seventy degrees centigrade. Vacuum (twenty to twenty-five millimeters of mercury absolute) is maintained on the reaction mixture for two hours and fifteen minutes to insure complete removal of the water of reaction. The reaction product is discharged into a suitable container and allowed to cool to room temperature.

Using the procedure of Example 1, additional catalyst compositions are prepared in accordance with the invention using antimony compounds other than the oxides. The specific metallic compound as well as the ratios of glycerol to metallic compound are shown in the following examples.

| Example No. | Metallic compounds | Ratio of glycerol to metallic compound |
|---|---|---|
| 6 | Antimony trichloride | 4:1 |
| 7 | do | 2:1 |
| 8 | Antimony oxychloride | 4:1 |
| 9 | do | 2:1 |
| 10 | Tris (2-chloroethyl) antimonite | 3:1 |
| 11 | do | 2:1 |
| 12 | Tris (2-chloro-2-phenyl ethyl) antimonite | 3:1 |
| 13 | Tris (2-chloropropyl) antimonite | 2:1 |
| 14 | Tris (n-octyl) antimonite | 2:1 |
| 15 | Tribenzyl antimonite | 2:1 |

Example 16

This example illustrates the preparation of flame retardant rigid urethane foams using the product of the present invention as a catalyst.

A rigid urethane foam is produced from:
(a) 100 grams of polyester prepared from 5 moles of trimethylolpropane and 3 moles of adipic acid reacted to and acid number of 1;
(b) 0.5 gram of surfactant; and
(c) 0.7 gram of N,N,N′,N′-tetramethyl-1,3-butane di-amine;

to the above ingredients, a–c, there is added with rapid stirring;

(d) 125 grams of semi-prepolymer prepared from 75 parts of tolylene diisocyanate isomers and 25 parts of a polyester prepared from 7.6 moles of glycerine, 4 moles of 1,4,5,6,7,7-hexachlorobicyclo(2,2,1)-5-heptene-2,3-dicarboxylic acid, and 2 moles of adipic acid reacted to an acid number of 5;
(e) 35 grams of trichlorofluromethane; and
(f) 30 grams of the reaction product of trimethylolpropane and antimony trioxide prepared in accordance with the procedure of Example 2.

The foam expands and cures at room temperature to produce a self-extinguishing foam of normal resilience. Attempts to use antimony trioxide, sodium antimonate or sodium antimony tartrate as catalysts lead to friable foams. When using the reaction product of antimony trioxide and excess trimethylolpropane as prepared in Example 2, no difficulty in dissolving the material or obtaining a homogenous system is experienced.

Foam prepared in accordance with the above procedure is compared with foam prepared from an identical composition with the exception of using purified trimethylolpropane antimonite as the catalyst in an amount equivalent in antimony content to the 30 grams of reaction mixture above employed. The foam produced using the catalyst of Example 2 is as satisfactory in all respects as that produced using the pure trimethylolpropane antimonite. Additionally, the catalyst of Example 2 forms a uniform homogenous foam system more rapidly and efficiently than the pure trimethylolpropane antimonite and the results are more uniform and predictable.

Example 17

The results obtained in Example 16 are reproduced by repeating the procedure of Example 16 except that the antimony trioxide is introduced into the trimethylolpropane used to prepare the polyester prior to the reaction with adipic acid. In this preparation, the entire five moles of trimethylolpropane is heated to the temperature range of one hundred and sixty to one hundred and eighty-five degrees centigrade in the presence of the antimony trioxide. Thereafter the heated trimethylolpropane containing the antimony ester is reacted with the adipic acid to prepare the polyester for use in the polyurethane foam preparation.

Example 18

The following components are mixed until a homogenous suspension occurs:

This example illustrates the preparation of flame retardant flexible foam.

(a) 191 grams of polyether, which is the reaction product of 1 mole of trimethylolpropane and 41.5 moles of propylene oxide; and (b) 117 grams of polyether, which is the reaction product of 1 mole of trimethylolpropane and 24.5 moles of propylene oxide;

(c) 3.1 grams of surfactant;

(d) 1.1 grams of dibutyltin dilaurate;

(e) 14.4 grams of water;

(f) 93 grams of perchloropentacyclo-(5.2.1.0$^{2,6}$.0$^{3,9}$.0$^{5,8}$)-decane; and (g) 187 grams of the reaction product of antimony trioxide and excess glycerol prepared in accordance with the procedure of Example 1.

To the above ingredients, 149 grams of tolylene diisocyanate isomers is added with rapid stirring. The liquid is poured into a mold and permitted to expand at room temperature for 3 minutes. The foam was placed in an oven for 15 minutes at 75° C., crushed, and then cured for 1 hour at 120° C.

The resultant foam is resilient, tough and flame retardant. Heat aging at 120° C. for two weeks shows no loss of resilience, while a similar sample without the reaction product of antimony trioxide and excess glycerol prepared in accordance with the procedure of Example 1 is totally degraded in two days.

The foam described above is compared with foam prepared following an identical procedure with the exception of using pure glycerol antimonite in a quantity providing the same amount of antimony as that used in the above example. The foam prepared in accordance with the above example is fully as good as that prepared from the pure glycerol antimonite catalyst. In addition, the catalyst reaction product of Example 1 appeared to form a uniform mixture more rapidly.

Example 19

This example illustrates the effectiveness of the reaction product of the present invention without purification as a catalyst in oxyalkylation reactions.

One approach to produce a polyester suitable for urethane foams is to react a polyol, acid anhydride and an excess of alkylene oxide to yield a neutral ester. For example, ethylene glycol, maleic anhydride and propylene oxide may be reacted to yield a substantially neutral ester. In such reactions, it is desirable to react as much of the alkylene oxide as possible for reasons of viscosity and economics.

The following data illustrate the effectiveness of the reaction product of trimethylolpropane and antimony trioxide as prepared in Example 2, when compared with other conventional prior art catalysts for such a reaction, and when using the same polyol, anhydride and alkylene oxide:

| Catalyst: | Reacted moles alkylene oxide/mole acid anhydride |
|---|---|
| Sodium acetate | 1.8 |
| Sodium hydroxide | 1.8 |
| Triethylamine | 2.1 |
| Pyridine | 1.75 |
| The reaction product of trimethylolpropane and antimony trioxide prepared in accordance with Example 2 | 3.5–4.0 |
| BF$_3$-etherate | 3.95 |

The above results indicate that the reaction product of trimethylolpropane and antimony trioxide prepared in accordance with Example 2 is a very effective catalyst for oxyalkylation reactions. In this respect, it is superior to sodium acetate, sodium hydroxide, triethylamine and pyridine, and about equivalent to BF$_3$-etherate. However, it has far greater hnadling ease than BF$_3$-etherate. Thus, the reaction product of the present invention is much more effective and desirable than the usual prior art catalysts for oxyalkylation reactions.

The methods of this invention can also be applied to the reaction of the antimony and bismuth compounds with dihydric alcohols. However the resulting compositions are much less desirable for the preparation of polyurethanes, polyesters, etc. However, the following examples exemplify such preparations.

Example 20

Nine moles of propyleneglycol and one mole of antimony trioxide are admixed and heated to a temperature range of one hundred and seventy to one hundred and seventy-five degrees centigrade. The water of reaction is removed from the composition over a period of three hours and fifteen minutes during which time the temperature of the reaction mixture rises to one hundred and eighty-seven degrees centigrade. The reactor contents are poured into a container and cooled to room temperature.

Example 21

Five moles of diethylene glycol are mixed with one mole of antimony trioxide and heated to the temperature range of one hundred and ninety to two hundred degrees centigrade. Vacuum (fourteen millimeters mercury absolute) is applied and the water of reaction is removed over a period of five and one-half hours, after which the reaction mixture is poured into a container and cooled to room temperature.

While the invention has been described with reference to certain specific embodiments, it will be recognized by those skilled in the art that many variations are possible without departing from the spirit and scope of the invention.

We claim:

1. A catalytic composition consisting essentially of an antimony alcoholate of an alkanol selected from the group consisting of trimethylolpropane and glycerol, and as a carrier therefor an excess amount of said alkanol; said composition containing at least 1.5 moles of alcoholic component for each unit atomic weight of antimony.

2. The catalytic composition of claim 1 wherein the alkanol is trimethylolpropane.

3. The catalytic composition of claim 1 wherein the alkanol is glycerol.

4. A process for preparing a catalytic composition comprising reacting together antimony trioxide and an alkanol selected from the group consisting of trimethylolpropane and glycerol, the reaction mixture consisting essentially of the alkanol and the antimony compound in a ratio which provides at least 1.5 moles of the alkanol for each unit atomic weight of the antimony, the alkanol being present in an amount of provide a reaction medium during the reaction and to act as a carrier for the resultant reaction product, the reaction mixture after completing the reaction containing excess unreacted alkanol as a carrier for the reaction product, and the reaction product being present therein.

5. The process of claim 4 wherein the alkanol is trimethylolpropane.

6. The process of claim 4 wherein the alkanol is glycerol.

References Cited

UNITED STATES PATENTS 3,359,218  12/1967  Wiles _____ 260—446 XR
3,109,853  11/1963  Worsley et al. _____ 252—431

PATRICK P. GARVIN, Primary Examiner

U.S. Cl. X.R.

260—2, 2.5, 75, 446; 447, 485, 615